US012598581B2

(12) United States Patent
Hong

(10) Patent No.: US 12,598,581 B2
(45) Date of Patent: Apr. 7, 2026

(54) METHOD FOR SENDING PAGING CAUSE AND METHOD FOR ACQUIRING PAGING CAUSE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 475 days.

(21) Appl. No.: 18/018,771

(22) PCT Filed: Aug. 31, 2020

(86) PCT No.: PCT/CN2020/112677
§ 371 (c)(1),
(2) Date: Jan. 30, 2023

(87) PCT Pub. No.: WO2022/041245
PCT Pub. Date: Mar. 3, 2022

(65) Prior Publication Data
US 2023/0300793 A1     Sep. 21, 2023

(51) Int. Cl.
*H04W 68/02*        (2009.01)
*H04W 68/00*        (2009.01)

(52) U.S. Cl.
CPC ......... *H04W 68/02* (2013.01); *H04W 68/005* (2013.01)

(58) Field of Classification Search
None
See application file for complete search history.

(56) References Cited

FOREIGN PATENT DOCUMENTS

| CN | 102448167 A | 5/2012 | |
| CN | 111278107 A | 6/2020 | |
| WO | WO-2020185949 A2 * | 9/2020 | ............ H04W 76/10 |

OTHER PUBLICATIONS

PCT/CN2020/112677 English translation of International Search Report dated May 20, 2021, 2 pages.
European Patent Application No. 20950914.0, Search and Opinion dated Sep. 21, 2023, 20 pages.
Apple "Solution for communication suspension and resumption" SA WG2 Meeting #136-AH, S2-2000732, Jan. 2020, 3 pages.
3rd Generation Partnership Project; Technical Specification Group Services and System Aspects; Study on system enablers for devices having multiple Universal Subscriber Identity Modules (USIM)(Release 17), Jun. 2020, 77 pages.
Samsung "KI#1,Sol #1Update to clarify the UE and Network impacts" 3GPP TSG SA WG2 Meeting 140e, S2-2005671, Aug.-Sep. 2020, 7 pages.
OPPO "Updating of solution#1 in TR23.761" SA WG2 Meeting #136 AH, S2-2000309, Jan. 2020, 8 pages.

* cited by examiner

*Primary Examiner* — Gary Lafontant
(74) *Attorney, Agent, or Firm* — Cozen O'Connor

(57) ABSTRACT

A method for sending a paging cause includes sending a paging message to a terminal; sending a paging cause of the paging message to the terminal according to receiving request information sent by the terminal. The request information requests the network side device to send the paging cause of the paging message to the terminal.

19 Claims, 5 Drawing Sheets sending a paging message to a terminal ⟶ S101 in response to receiving request information from the terminal, sending a paging cause of the paging message to the terminal, in which the request information is configured to request the network side device to send the paging cause of the paging message to the terminal ⟶ S102

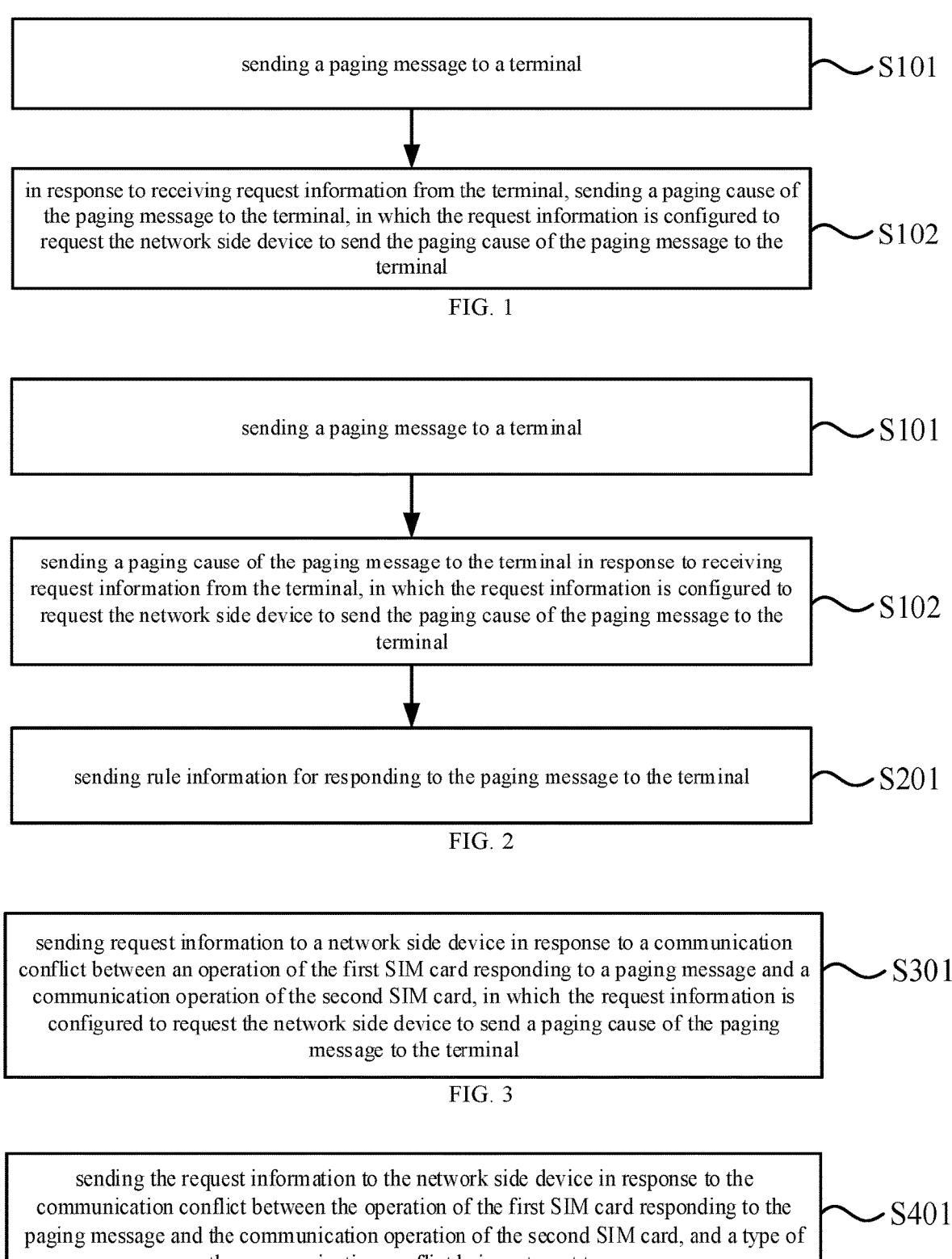

| sending a paging message to a terminal | S101 |

| in response to receiving request information from the terminal, sending a paging cause of the paging message to the terminal, in which the request information is configured to request the network side device to send the paging cause of the paging message to the terminal | S102 |

FIG. 1

| sending a paging message to a terminal | S101 |

| sending a paging cause of the paging message to the terminal in response to receiving request information from the terminal, in which the request information is configured to request the network side device to send the paging cause of the paging message to the terminal | S102 |

| sending rule information for responding to the paging message to the terminal | S201 |

FIG. 2

| sending request information to a network side device in response to a communication conflict between an operation of the first SIM card responding to a paging message and a communication operation of the second SIM card, in which the request information is configured to request the network side device to send a paging cause of the paging message to the terminal | S301 |

FIG. 3

| sending the request information to the network side device in response to the communication conflict between the operation of the first SIM card responding to the paging message and the communication operation of the second SIM card, and a type of the communication conflict being a target type | S401 |

FIG. 4

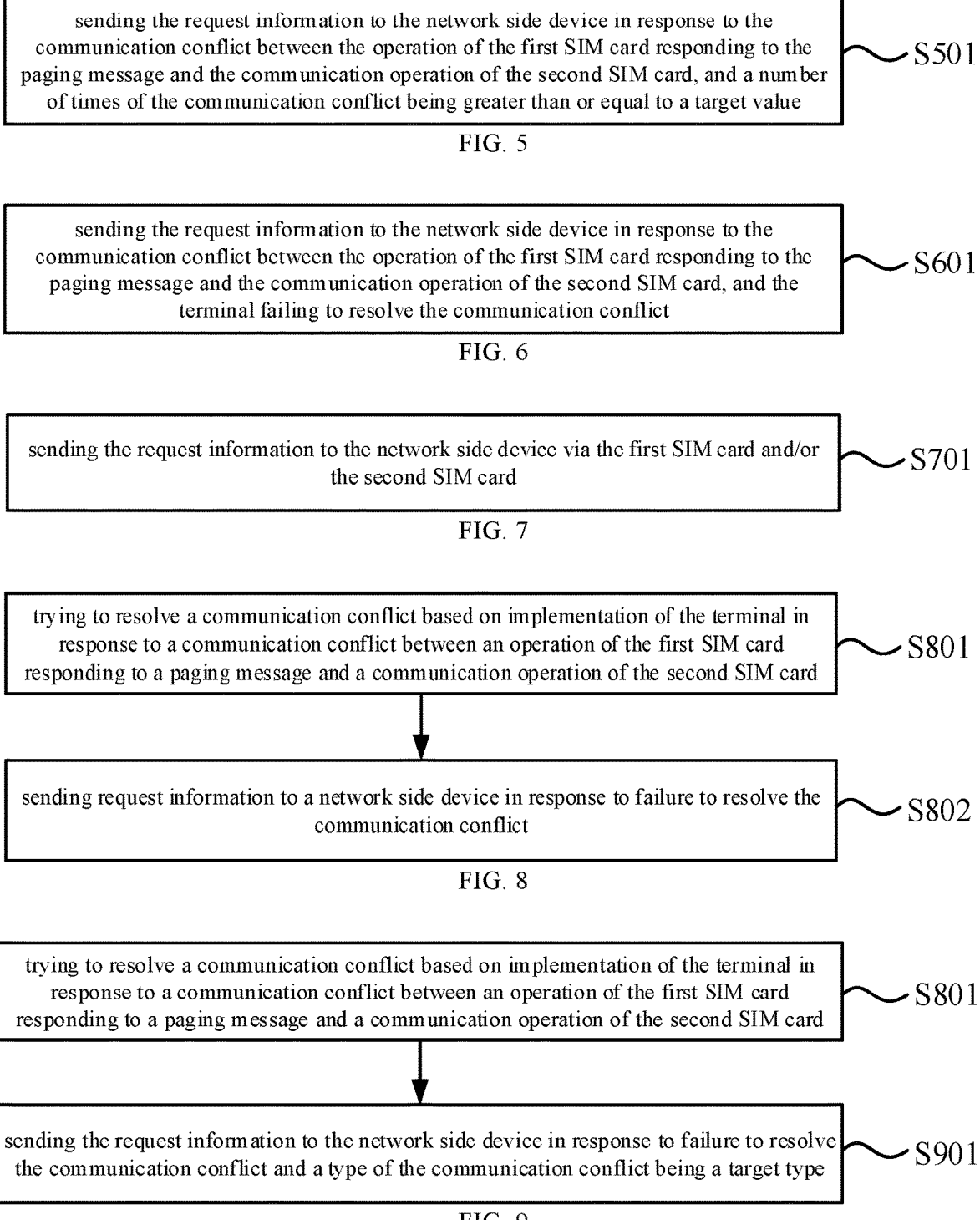

sending the request information to the network side device in response to the communication conflict between the operation of the first SIM card responding to the paging message and the communication operation of the second SIM card, and a number of times of the communication conflict being greater than or equal to a target value

S501

FIG. 5 sending the request information to the network side device in response to the communication conflict between the operation of the first SIM card responding to the paging message and the communication operation of the second SIM card, and the terminal failing to resolve the communication conflict

S601

FIG. 6 sending the request information to the network side device via the first SIM card and/or the second SIM card

S701

FIG. 7 trying to resolve a communication conflict based on implementation of the terminal in response to a communication conflict between an operation of the first SIM card responding to a paging message and a communication operation of the second SIM card

S801 sending request information to a network side device in response to failure to resolve the communication conflict

S802

FIG. 8 trying to resolve a communication conflict based on implementation of the terminal in response to a communication conflict between an operation of the first SIM card responding to a paging message and a communication operation of the second SIM card

S801 sending the request information to the network side device in response to failure to resolve the communication conflict and a type of the communication conflict being a target type

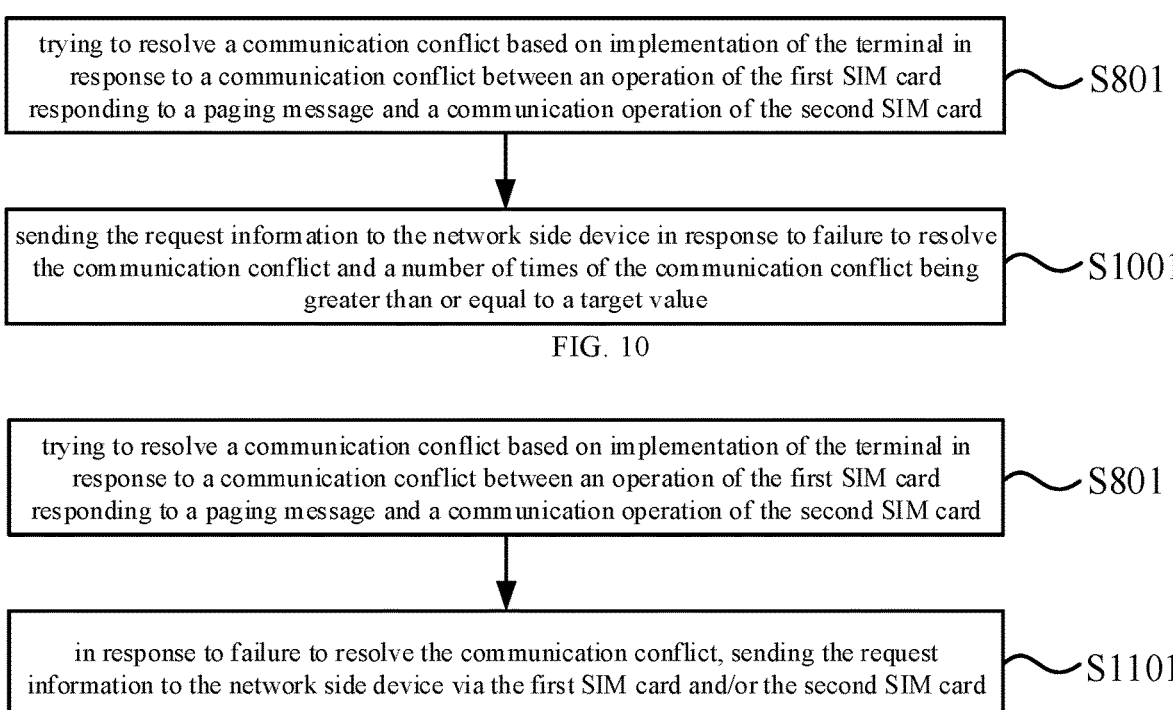

trying to resolve a communication conflict based on implementation of the terminal in response to a communication conflict between an operation of the first SIM card responding to a paging message and a communication operation of the second SIM card ⌒S801 sending the request information to the network side device in response to failure to resolve the communication conflict and a number of times of the communication conflict being greater than or equal to a target value ⌒S1001

FIG. 10 trying to resolve a communication conflict based on implementation of the terminal in response to a communication conflict between an operation of the first SIM card responding to a paging message and a communication operation of the second SIM card ⌒S801 in response to failure to resolve the communication conflict, sending the request information to the network side device via the first SIM card and/or the second SIM card ⌒S1101

FIG. 11

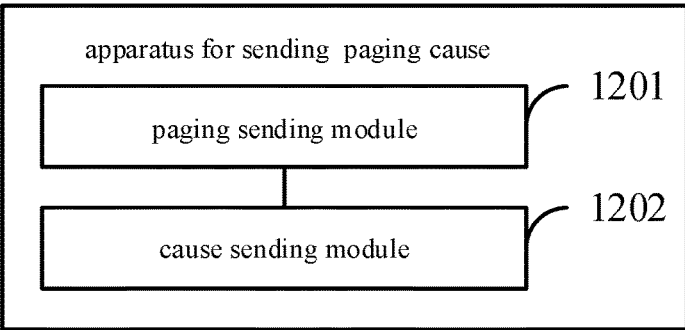

apparatus for sending paging cause paging sending module          1201 cause sending module          1202

FIG. 12

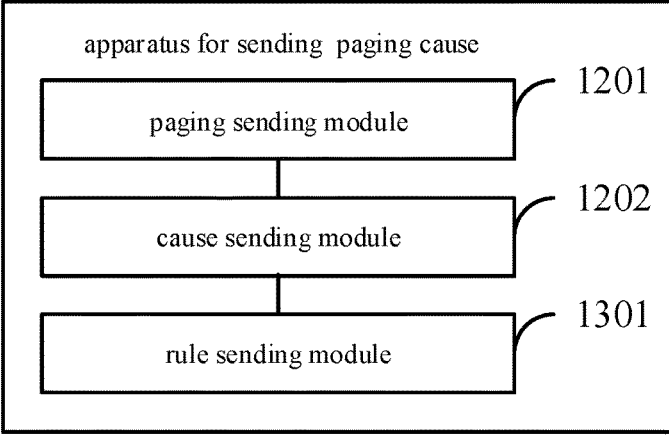

apparatus for sending paging cause paging sending module          1201 cause sending module          1202 rule sending module          1301

FIG. 13

METHOD FOR SENDING PAGING CAUSE AND METHOD FOR ACQUIRING PAGING CAUSE

CROSS REFERENCE TO RELATED APPLICATIONS

This application is a national phase application based on International Application No. PCT/CN2020/112677, filed Aug. 31, 2020, the entire content of which is incorporated by reference for all purposes.

TECHNICAL FIELD

The disclosure relates to the field of communication technologies, and provides a method for sending a paging cause, and a method for acquiring a paging cause.

BACKGROUND

A network side device such as a base station first sends a paging message to a terminal when requires communication with the terminal, for example, if the base station has a text message or phone call to deliver to the terminal. After receiving the paging message, the terminal may establish a communication connection with the network side device in response to making a decision to respond to the paging message.

The network side device may also send a paging cause of the paging message when sending the paging message. Accordingly, the terminal may not only receive the paging message but also receive the paging cause of the paging message. Generally, the terminal may determine whether to respond to the paging message based on the paging cause. This determination may be based on what types of services the terminal may accept, for example.

SUMMARY

According to a first aspect of the disclosure, a method for sending a paging cause, performed by a network side device, is provided. The method includes:

sending a paging message to a terminal;

sending a paging cause of the paging message to the terminal according to receiving request information sent by the terminal; in which the request information requests the network side device to send the paging cause of the paging message to the terminal.

According to a second aspect of the disclosure, a method for acquiring a paging cause, performed by a terminal, is provided. The terminal is at least configured with a first Subscriber Identity Module (SIM) card and a second SIM card. The method includes:

sending request information to a network side device according to a communication conflict between an operation of the first SIM card responding to a paging message and a communication operation of the second SIM card; in which the request information requests the network side device to send a paging cause of the paging message to the terminal.

According to a third aspect of the disclosure, a method for acquiring a paging cause, performed by a terminal, is provided. The terminal is at least configured with a first SIM card and a second SIM card. The method includes:

resolving a communication conflict based on implementation of the terminal, wherein the communication conflict is a communication conflict between an operation of the first SIM card responding to a paging message and a communication operation of the second SIM card; and sending request information to a network side device according to a failure to resolve the communication conflict.

BRIEF DESCRIPTION OF THE DRAWINGS

In order to clearly illustrate the technical solution of the embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive works.

FIG. 1 is a flowchart of a method for sending a paging cause according to an embodiment of the disclosure.

FIG. 2 is a flowchart of another method for sending a paging cause according to an embodiment of the disclosure.

FIG. 3 is a flowchart of a method for acquiring a paging cause according to an embodiment of the disclosure.

FIG. 4 is a flowchart of another method for acquiring a paging cause according to an embodiment of the disclosure.

FIG. 5 is a flowchart of yet another method for acquiring a paging cause according to an embodiment of the disclosure.

FIG. 6 is a flowchart of yet another method for acquiring a paging cause according to an embodiment of the disclosure.

FIG. 7 is a flowchart of yet another method for acquiring a paging cause according to an embodiment of the disclosure.

FIG. 8 is a flowchart of a method for acquiring a paging cause according to an embodiment of the disclosure.

FIG. 9 is a flowchart of another method for acquiring a paging cause according to an embodiment of the disclosure.

FIG. 10 is a flowchart of yet another method for acquiring a paging cause according to an embodiment of the disclosure.

FIG. 11 is a flowchart of yet another method for acquiring a paging cause according to an embodiment of the disclosure.

FIG. 12 is a schematic diagram of an apparatus for sending a paging cause according to an embodiment of the disclosure.

FIG. 13 is a schematic diagram of an apparatus for sending a paging cause according to the embodiment of the disclosure.

DETAILED DESCRIPTION

Figure 14:
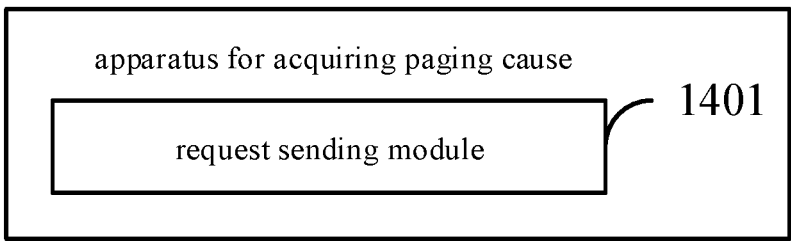
FIG. 14 is a schematic diagram of another apparatus for acquiring a paging cause according to an embodiment of the disclosure.

Reference will be made clearly and completely in the technical solution of the embodiments of the disclosure with the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

FIG. 1 is a flowchart of a method for sending a paging cause according to an embodiment of the disclosure. The method for sending a paging cause shown in this embodiment may be applicable for a network side device, such as a base station and a core network device. For example, the base station includes, but is not limited to, a base station in a communication system such as a 4G (4th Generation) base station, a 5G (5th Generation) base station, and a 6G (6th Generation) base station. The network side device may communicate with a terminal as a User Equipment (UE). The terminal includes, but is not limited to, a cell phone, a tablet computer, a wearable device, a sensor, an Internet of Things (IoT) device and other electronic devices. In an embodiment, the terminal may be a terminal to which the method for acquiring a paging cause described in any of the following embodiments is applied.

As shown in FIG. 1, the method for sending a paging cause may include the following steps.

At step S101, a paging message is sent to a terminal. For example, the paging message is sent by means of broadcast or unicast.

At step S102, a paging cause of the paging message is sent to the terminal in response to receiving request information sent by the terminal.

The request information requests the network side device to send the paging cause of the paging message to the terminal.

In the related art, the network side device sends the paging cause of the paging message when sending the paging message, so that the terminal can determine whether to respond to the paging message based on the paging cause. However, the terminal does not have to determine whether to respond to the paging message based on the paging cause, but can determine whether to respond to the paging message in other ways. For example, the terminal can determine whether to respond to the paging message based on its own implementation (e.g., information and algorithms stored in the terminal).

In an embodiment, during the communication operation of the second SIM card in the terminal, the first SIM card receives the paging message, thus, there is a communication conflict between the operation of the first SIM card for responding to the paging message and the communication operation of the second SIM card. In this case, or when the terminal cannot whether to respond to the paging message based on its own implementation, the terminal may send the request information to the network side device, to request the network side device to send the paging cause of the paging message to the terminal (e.g., by means of broadcast or unicast).

According to embodiments of the disclosure, the network side device may only send the paging message without sending the paging cause of the paging message when sending the paging message. After receiving the request information sent by the terminal, the network side device sends the paging cause of the paging message to the terminal. Accordingly, each time the network side device sends the paging message, it is not necessary to send the paging cause together with the paging message, which may help reduce signaling consumption of the network side device.

After receiving the paging cause, the terminal may determine whether to respond to the paging message according to the paging cause. For example, the paging cause may carry a service corresponding to the paging message, and after receiving the paging cause, the terminal may determine the service corresponding to the paging message according to the paging cause and further determine a type of the service, and then determine whether to respond to the paging message according to the type of the service.

In an embodiment, when there is more than one SIM card configured in the terminal, for example, at least the first SIM card and the second SIM card are configured in the terminal. When the second SIM card performs the communication operation, the network side device sends the paging message to the first SIM card and sends the paging cause to the terminal, and then the terminal sends the paging cause to the first SIM card or the second SIM card.

For example, when the network side device is the base station, the base station may send the paging cause to the first SIM card by means of broadcast. For example, after broadcasting the paging message, the base station may broadcast the paging message again (one or more times), and the paging message broadcasted again may carry the paging cause. The base station may send the paging cause to the SIM card by means of unicast, e.g., the base station may temporarily establish a communication connection with the first SIM card and then send the paging cause to the first SIM card. Alternatively, the second SIM card may be communicatively connected to the base station that sends the paging message, and the base station may also send the paging cause to the second SIM card, and then the second SIM card may forward the received paging cause to the first SIM card.

FIG. 2 is a flowchart of another method for sending a paging cause according to an embodiment of the disclosure. In some embodiments, the terminal requests the network side device to send the paging cause of the paging message only when the terminal cannot whether to respond to the paging message. However, the terminal may still not be able to accurately determine whether to respond to the paging message based on the paging cause.

As shown in FIG. 2, the method further includes the following steps.

At step S202, rule information for responding to the paging message is sent to the terminal.

The rule information instructs the terminal, in response to the communication conflict between the operation of the first SIM card in the terminal responding to the paging message and the communication operation of the second SIM card in the terminal, to resolve the communication conflict based on the rule information.

It is noted that step S202 may be executed after step S102 as shown in FIG. 2, or step S202 and step S102 may be executed according to the order of execution adjusted as required. For example, the step S202 and the step S102 may be executed simultaneously, or the step S202 may be executed before the step S102. In some embodiments, it is possible to choose to execute the step S102 or to execute the step S202. For example, the step S202 may be executed first to indicate the rule information to the terminal, and assuming that the terminal can resolve the communication conflict based on the rule information, it is unnecessary to further execute the step S102. The step S102 is further executed only when the terminal resolves the communication conflict based on the paging cause. Alternatively, the step S102 may be executed first, and assuming that the terminal can resolve the communication conflict based on the paging cause, then it is not necessary to perform the step S202, then step S202 is further performed when the terminal resolves the communication conflict based on the rule information.

In an embodiment, at least the first SIM card and the second SIM card may be provided in the terminal. When the terminal performs the communication operation by the second SIM card, and the first SIM card receives the paging message, there is a communication conflict between the operation of the first SIM card responding to the paging message and the communication operation of the second SIM card, and the terminal requires to determine whether to continue the communication operation of the second SIM card or to respond to the paging message via the first SIM card to resolve the communication conflict.

The communication operation of the second SIM card includes, but is not limited to, operations of the second SIM card responding to other paging messages, and operations of the second SIM card performing voice, and/or video, and/or text communication.

In an embodiment, the terminal may try to resolve the communication conflict based on its own implementation (e.g., information and algorithms stored in the terminal). However, in some cases, the terminal cannot resolve the communication conflict based on its own implementation, and then the terminal may send the request message to the network side device. After receiving the request message, the network side device may send the paging cause of the paging message to the terminal, so that the terminal can resolve the communication conflict based on the paging cause, such as determining whether to respond to the paging message based on the paging cause.

However, in some cases, the terminal is not enough to determine whether to respond to the paging message based on the paging cause. In order to cope with the above situation, the network side device may send not only the paging cause but also the rule information to the network side device, so that the terminal can determine whether to respond to the paging message based on the paging cause and/or the rule information.

Optionally, the rule information includes resolving the communication conflict based on a relation between a first priority of a service corresponding to the paging cause and a second priority of a service corresponding to the communication operation.

In an embodiment, the paging cause may carry the service corresponding to the paging message, and the terminal may determine the service corresponding to the paging message based on the paging cause, and thus the first priority of the service corresponding to the paging message is determined. For the communication operation that the second SIM card is performing, the terminal may determine the service corresponding to the communication operation and the second priority of the service corresponding to the communication operation.

In an embodiment, although the terminal can determine the first priority and the second priority, it does not further determine how to resolve the communication conflict. The network side device sends the rule information to the terminal, to instruct the terminal to resolve the communication conflict based on the rule information. For example, the rule information may be resolving the communication conflict based on the relation between the first priority and the second priority. After receiving the rule information, the terminal may determine the relation between the first priority and the second priority, for example, comparing levels of the first priority and the second priority, and then determine how to resolve the communication conflict based on the relation.

For example, the rule information may be performing the communication operation with higher priority between the first priority and the second priority, and the terminal may determine the levels of the first priority and the second priority. For example, in response to determining that a level of the first priority is higher, the terminal may perform the communication operation corresponding to the first priority, i.e., responding to the paging message via the first SIM card. For another example, in response to determining that a level of the second priority is higher, the terminal may perform the communication operation corresponding to the second priority, i.e., continuing to perform the communication operation via the second SIM card without responding to the paging message via the first SIM card.

Optionally, the rule information includes resolving the communication conflict based on a relation between a current quality of service (QoS) of the service corresponding to the communication operation and a minimum QoS of the service corresponding to the communication operation.

In an embodiment, the rule information may include resolving the communication conflict based on the relation between the current QoS of the service corresponding to the communication operation and the minimum QoS of the service corresponding to the communication operation. The terminal may determine the current QoS of the service corresponding to the communication operation based on the rule information, and further determine the relation between the current QoS and the minimum QoS of the service corresponding to the communication operation, and then resolve the communication conflict based on the determined relation.

For example, the rule information is responding to the paging message via the first SIM card when the current QoS is higher than the minimum QoS or when the current QoS is much higher than the minimum QoS (e.g. a ratio of the current QoS to the minimum QoS is greater than 100), otherwise, not responding to the paging message via the first SIM card. Therefore, the terminal may compare the current QoS and the minimum QoS and determine whether to respond to the paging message via the first SIM card based on a comparison result.

Accordingly, the terminal determines not responding to the paging message when the current QoS is low, to ensure that the communication operation of the second SIM card can be executed smoothly. Moreover, the terminal may determine responding to the paging message when the current QoS is high enough, to response to the paging message as soon as possible while ensuring that the communication operation of the second SIM card can be executed smoothly.

For example, the QoS is represented in terms of packet loss rate, the minimum QoS is the packet loss rate of $10^{-2}$ per unit time, and the current QoS is the packet loss rate of $10^{-5}$ per unit time, which is much higher than the minimum QoS, so that the terminal can respond to the paging message via the first SIM card in a short time (e.g., unit time, and the unit time may for example be 1 millisecond).

It is noted that the above embodiments regarding the rule information may be combined, i.e., the rule information includes solving the communication conflict based on the relation between the first priority and the second priority and the relation between the current QoS and the minimum QoS.

For example, when the level of the first priority is higher than the level of the second priority, there is no need to compare the current QoS and the minimum QoS, the terminal may determine to respond to the paging message directly. When the level of the first priority is equal to or lower than the level of the second priority, the terminal may further compare the current QoS with the minimum QoS, and when the current QoS is higher than the minimum QoS or the current QoS is much higher than the minimum QoS, the terminal determines to response to the paging message via the first SIM card.

FIG. 3 is a flowchart of a method for acquiring a paging cause according to an embodiment of the disclosure. The method for acquiring a paging cause shown in this embodiment may be applicable for a terminal. The terminal includes, but is not limited to, a cell phone, a tablet computer, a wearable device, a sensor, an IoT device and other electronic devices. The terminal, as a UE, may communicate with a network side device. The network side device may be a base station, or a core network device, etc. The base station may include, but not limited to, a 4G base station, a 5G base station, and a 6G base station. In an embodiment, the network side device may be a network side device to which the method for acquiring a paging cause described in any of the above embodiments is applied.

One or more SIM cards may be provided in the terminal. For example, the terminal may include a first SIM card, or the terminal may include a first SIM card and a second SIM card. In a case that more than one SIM card is provided in the terminal, some or all of the SIM cards may access different operator networks or to the same operator network. Communication modes supported by the more than one SIM can be set as desired, such as dual SIM single standby, dual SIM dual standby single pass, and dual SIM dual standby dual pass. Illustrative explanation is made below mainly on a case where the terminal is configured with the first SIM card and the second SIM card.

As shown in FIG. 3, the method for acquiring a paging cause includes the following steps.

At step S301, in response to a communication conflict between an operation of the first SIM card responding to a paging message and a communication operation of the second SIM card, request information is sent to a network side device.

The request information requests the network side device to send a paging cause of the paging message to the terminal.

In an embodiment, during the communication operation of the second SIM card in the terminal, when the first SIM card receives the paging message, the communication conflict exists between the operation of the first SIM card responding to the paging message and the communication operation of the second SIM card. In this case, the terminal may send the request message to the network side device, to request the network side device to send the paging cause of the paging message to the terminal, such as by means of broadcast or unicast, further the communication conflict is resolved based on the paging cause.

The network side device can send the paging cause of the paging message to the terminal after receiving the request information sent by the terminal. When sending the paging message, the network side device may send the paging message without the paging cause of the paging message. Accordingly, each time the network side device sends the paging message, it is not necessary to send the paging cause together with the paging message, thereby facilitating reducing signaling consumption of the network side device.

FIG. 4 is a flowchart of another method for acquiring a paging cause according to an embodiment of the disclosure. As shown in FIG. 4, in response to the communication conflict between the operation of the first SIM card responding to the paging message and the communication operation of the second SIM card, sending the request information to the network side device includes the following steps.

At step S401, in response to the communication conflict between the operation of the first SIM card responding to the paging message and the communication operation of the second SIM card and a type of the communication conflict being a target type, the request information is sent to the network side device.

In an embodiment, the communication operation of the second SIM card includes, but is not limited to, operations of the second SIM card responding to other paging messages, and operations of the second SIM card performing voice, and/or video, and/or text communication.

On the basis, the type of the communication conflict may be, for example, a conflict between an operation of the second SIM card responding to the paging message and the operation of the first SIM card responding to the paging message, a conflict between a voice communication of the second SIM card and the operation of the first SIM card responding to the paging message, a conflict between a video communication of the second SIM card and the operation of the first SIM card responding to the paging message, or a conflict between a text communication of the second SIM card and the operation of the first SIM card responding to the paging message.

In an embodiment, the request information can be sent to the network side device when the type of the communication conflict is the target type. For example, the terminal dose not determine how to resolve the communication conflict based on the paging cause for a communication conflict of a type other than the target type, while the terminal determines how to resolve the communication conflict based on the paging cause for the target type. Therefore, the terminal sends the request information to the network side device when the type of the communication conflict is the target type, and it is not necessary to send the request information to the network side device when the type of the communication conflict is a type other than the target type, which may reduce the number of times of sending the request information and to reduce occupation of communication resources.

FIG. 5 is a flowchart of yet another method for acquiring a paging cause according to an embodiment of the disclosure. As shown in FIG. 5, in response to the communication conflict between the operation of the first SIM card responding to the paging message and the communication operation of the second SIM card, sending the request information to the network side device includes the following steps.

At step S501, in response to the communication conflict between the operation of the first SIM card responding to the paging message and the communication operation of the second SIM card and a number of times of the communication conflicts being greater than or equal to a target value, the request information is sent to the network side device.

In an embodiment, the communication conflict between the operation of the first SIM card responding to the paging message and the communication operation of the second SIM card may occur once or may be repeated several times. For example, the first SIM card receives the paging message several times during the communication operation of the second SIM card, an operation of responding to the paging message each time receiving the paging message conflicts with the communication operation of the second SIM card, then there will be more than one communication conflict.

When the number of times of the communication conflict is small, for example, the number of times of the communication conflict is less than the target value, an impact of the communication conflict on a normal communication of the terminal is small, and it is not necessary to send the request message to the network side device. When the number of times of the communication conflict is large, for example, the number of times of the communication conflict is greater than or equal to the target value, the communication conflicts have a greater impact on the normal communication of the terminal, and then the terminal sends the request information to the network side device.

For example, when the communication operation of the second SIM card is executed when the first SIM card receives the paging message for the first time, a communication conflict occurs between the operation of the first SIM card responding to the paging message and the communication operation of the second SIM card. When the first SIM card receives the paging message for the second time, the communication operation of the second SIM card has completed, thus the communication conflict between the operation of the first SIM card responding to the paging message and the communication operation of the second SIM card has disappeared. The number of times of the communication conflict in this process is one, and the less the number of times of the communication conflict, the smaller the impact on the normal communication of the terminal, so it is unnecessary to send the request message to the network side device, which can reduce the number of times of sending the request message and reduce occupation for communication resources.

FIG. 6 is a flowchart of a method for acquiring a paging cause according to yet another embodiment of the disclosure. As shown in FIG. 6, in response to the communication conflict between the operation of the first SIM card responding to the paging message and the communication operation of the second SIM card, sending the request information to the network side device includes the following step.

At step S601, in response to the communication conflict between the operation of the first SIM card responding to the paging message and the communication operation of the second SIM card and the terminal failing to resolve the communication conflict, the request information is sent to the network side device.

In an embodiment, when the communication conflict between the operation of the first SIM card responding to the paging message and the communication operation of the second SIM card occurs, the terminal may try to resolve the communication conflict. For example, the terminal may determine a first priority of a service corresponding to the paging message received by the first SIM card and a second priority of a service corresponding to the communication operation of the second SIM card based on its own implementation, and then the terminal may determine how to resolve the communication conflict based on a relation between the first priority and the second priority, and there is no need to send the request information to the network side device. The request message is sent to the network side device when the terminal cannot resolve the communication conflict based on its own implementation, which can reduce the number of times of sending the request message and reduce occupation for communication resources.

FIG. 7 is a flowchart of yet another method for acquiring a paging cause according to an embodiment of the disclosure. As shown in FIG. 7, sending the request information to the network side device includes the following step.

At step S701, the request information is sent to the network side device via the first SIM card and/or the second SIM card.

In an embodiment, the terminal can send the request information to the network side device via the first SIM card, or also send the request information to the network side device via the second SIM card.

For example, the terminal can establish a communication connection with the network side device via the first SIM card, and then send the request message to the network side device by the established communication connection.

For example, when the second SIM card has a communication connection with a network side device that sends the paging message to the first SIM card, the request message can be sent to the network side device via the second SIM card. In this case, the network side device can send the paging cause to the first SIM card or the paging cause to the second SIM card. For example, when the request message carries an identifier of the first SIM card, the paging cause can be sent to the first SIM card, and when the request message does not carry the identifier of the first SIM card, the paging cause can be sent to the second SIM card.

Optionally, the network side device is a core network device, and the request information is carried in a non-access stratum (NAS) signaling, and/or the network side device is a base station, and the request information is carried in an access stratum (AS) signaling.

In an embodiment, the network side device includes, but is not limited to, a core network device and a base station.

In an embodiment, when the network side device is the core network device, the terminal can send the request information to the core network device via the NAS signaling. For example, the request information can be carried in the NAS signaling, such as a registration request signaling, a service request signaling, a mobility registration update signaling, and then sent to the core network device by the terminal. The terminal may send the NAS signaling via the first SIM card or the second SIM card.

In an embodiment, when the network side device is the base station, the terminal can send the request information to the base station via the AS signaling. For example, the request information can be carried in a radio resource control (RRC) signaling and sent to the base station. For example, the request information can be carried in a UEAssistanceInformation signaling and sent to the base station. The terminal can send the AS signaling via the first SIM card or the second SIM card.

FIG. 8 is a flowchart of a method for acquiring a paging cause according to an embodiment of the disclosure. The method for acquiring a paging cause shown in this embodiment may be applicable for a terminal. The terminal includes, but is not limited to, a cell phone, a tablet computer, a wearable device, a sensor, an IoT device and other electronic devices. The terminal, as a UE, may communicate with a network side device. The network side device may be a base station, or a core network device. The base station includes but is not limited to a 4G base station, a 5G base station, and a 6G base station. In an embodiment, the network side device may be a network side device to which the method for acquiring a paging cause described in any of the above embodiments is applied.

One or more SIM cards may be provided in the terminal. For example, the terminal may include a first SIM card, or the terminal may include a first SIM card and a second SIM card. When more than one SIM card is provided in the terminal, some or all of the SIM cards may access different operator networks or to the same operator network. Communication modes supported by the more than one SIM can be set as desired, such as dual SIM single standby, dual SIM dual standby single pass, and dual SIM dual standby dual pass. Illustrative explanation is made below mainly on a case where the terminal is configured with the first SIM card and the second SIM card.

As shown in FIG. 8, the method for acquiring a paging cause includes the following steps.

At step S801, in response to a communication conflict between an operation of the first SIM card responding to a paging message and a communication operation of the second SIM card, the terminal tries to resolve the communication conflict base on implementation of the terminal.

At step S802, in response to failure to resolve the communication conflict, request information is sent to a network side device.

In an embodiment, during the communication operation of the second SIM card in the terminal, when the first SIM card receives the paging message, the communication conflict exists between the operation of the first SIM card responding to the paging message and the communication operation of the second SIM card.

In this case, the terminal may try to resolve the communication conflict based on its own implementation (e.g., information and algorithms, etc., stored in the terminal). In response to the terminal failing to resolve the communication conflict, the terminal may send the request information to the network side device, to request the network side device to send the paging cause of the paging message to the terminal (e.g., by means of broadcast or unicast).

Accordingly, the terminal sends the request information to the network side device, when the terminal cannot resolve the communication conflict based on its own implementation. The terminal does not send the request information to the network side device when the terminal can resolve the communication conflict based on its own implementation, which can reduce consumption of signaling by the terminal.

Moreover, the network side device can send the paging cause of the paging message to the terminal after receiving the request information sent by the terminal. When sending the paging message, the network side device can send the paging message without the paging cause of the paging message. Therefore, each time the network side device sends the paging message, it is not necessary to send the paging cause together with the paging message, which may facilitate reducing consumption of signaling by the network side device.

FIG. 9 is a flowchart of another method for acquiring a paging cause according to an embodiment of the disclosure. As shown in FIG. 9, in response to failure to resolve the communication conflict, sending the request information to the network side device includes the following steps.

At step S901, in response to failure to resolve the communication conflict and a type of the communication conflict being a target type, the request information is sent to the network side device.

In an embodiment, the communication operation of the second SIM card includes, but is not limited to, operations of the second SIM card responding to other paging messages, and operations of the second SIM card performing voice, and/or video, and/or text communication.

On the basis, the type of the communication conflict may be, for example, a conflict between an operation of the second SIM card responding to the paging message and the operation of the first SIM card responding to the paging message, a conflict between a voice communication of the second SIM card and the operation of the first SIM card responding to the paging message, a conflict between a video communication of the second SIM card and the operation of the first SIM card responding to the paging message, or a conflict between a text communication of the second SIM card and the operation of the first SIM card responding to the paging message.

In an embodiment, the request information can be sent to the network side device when the type of the communication conflict is the target type. For example, the terminal dose not determine how to resolve the communication conflict based on the paging cause for a communication conflict of a type other than the target type, while the terminal determines how to resolve the communication conflict based on the paging cause for the target type. Therefore, the terminal sends the request information to the network side device when the type of the communication conflict is the target type, and it is not necessary to send the request information to the network side device when the type of the communication conflict is a type other than the target type, which may reduce the number of times of sending the request information and to reduce occupation of communication resources.

FIG. 10 is a flowchart of yet another method for acquiring a paging cause according to an embodiment of the disclosure. As shown in FIG. 10, in response to failure to resolve the communication conflict, sending the request information to the network side device includes the following step.

At step S1001, in response to failure to resolve the communication conflict and a number of times of the communication conflict being greater than or equal to a target value, the request information is sent to the network side device.

In an embodiment, the communication conflict between the operation of the first SIM card responding to the paging message and the communication operation of the second SIM card may occur once or may be repeated several times, For example, the first SIM card receives the paging message several times during the communication operation of the second SIM card, an operation of responding the paging message each time receiving the paging message conflicts with the communication operation of the second SIM card, then there will be more than one communication conflict.

When the number of times of the communication conflict is small, for example, the number of the communication conflict is less than the target value, an impact of the communication conflict on a normal communication of the terminal is small, and it is not necessary to send the request message to the network side device. When the number of times of the communication conflict is large, for example, the number of times of the communication conflict is greater than or equal to the target value, the communication conflicts have a greater impact on the normal communication of the terminal, and then the terminal sends the request information to the network side device.

For example, when the communication operation of the second SIM card is executed when the first SIM card receives the paging message for the first time, a communication conflict occurs between the operation of the first SIM card responding to the paging message and the communication operation of the second SIM card. When the first SIM card receives the paging message for the second time, the communication operation of the second SIM card has completed, thus the communication conflict between the operation of the first SIM card responding to the paging message and the communication operation of the second SIM card has disappeared. The number of times of the communication conflict in this process is one, and the less the number of times of the communication conflict, the smaller the impact on the normal communication of the terminal, so it is unnecessary to send the request message to the network side device, which can reduce the number of times of sending the request message and reduce occupation for communication resources.

FIG. 11 is a flowchart of yet another method for acquiring a paging cause according to an embodiment of the disclosure. As shown in FIG. 11, sending the request information to the network side device includes the following step.

At step S1101, the request information is sent to the network side device via the first SIM card and/or the second SIM card.

In an embodiment, the terminal may send the request information to the network side device via the first SIM card, or also send the request information to the network side device via the second SIM card.

For example, the terminal establishes a communication connection with the network side device via the first SIM card, and then send the request message to the network side device based on the established communication connection.

For example, when the second SIM card has a communication connection with a network side device that sends the paging message to the first SIM card, the request message can be sent to the network side device via the second SIM card. In this case, the network side device can send the paging cause to the first SIM card or the paging cause to the second SIM card. For example, when the request message carries an identifier of the first SIM card, the paging cause can be sent to the first SIM card, and when the request message does not carry the identifier of the first SIM card, the paging cause can be sent to the second SIM card.

Optionally, the network side device is a core network device, and the request information is carried in a NAS signaling; and/or the network side device is a base station, and the request information is carried in an AS signaling.

In an embodiment, the network side device includes, but is not limited to, a core network device, and a base station.

In an embodiment, when the network side device is a core network device, the terminal may send the request information to the core network device via the NAS signaling. For example, the request information can be carried in the NAS signaling, such as a registration request signaling, a service request signaling, a mobility registration update signaling, and then sent to the core network device by the terminal. The terminal may send the NAS signaling via the first SIM card or the second SIM card.

Corresponding to the foregoing embodiments of the method for sending a paging cause and the method for acquiring a paging cause, the disclosure also provides embodiments of an apparatus for sending a paging cause and an apparatus for acquiring a paging cause.

FIG. 12 is a schematic diagram of an apparatus for sending a paging cause according to an embodiment of the disclosure. The apparatus for sending a paging cause shown in this embodiment may be applicable for a network side device, such as a base station and a core network device. For example, the base station includes, but is not limited to, a base station in a communication system such as a 4G base station, a 5G base station, and a 6G base station. The network side device may communicate with a terminal which is as a UE. The terminal includes, but is not limited to, a cell phone, a tablet computer, a wearable device, a sensor, an IoT device and other electronic devices. In an embodiment, the terminal may be a terminal to which the method for acquiring a paging cause described in any of the following embodiments is applied.

As shown in FIG. 12, the apparatus for sending a paging cause includes: a paging sending module 1201 and a cause sending module 1202.

The paging sending module 1201 is configured to send a paging message to a terminal.

The cause sending module 1202 is configured to send a paging cause of the paging message to the terminal in response to receiving request information sent by the terminal.

The request information requests the network side device to send the paging cause of the paging message to the terminal.

FIG. 13 is a schematic diagram of another apparatus for sending a paging cause according to an embodiment of the disclosure. As shown in FIG. 13, the apparatus further includes: a rule sending module 1301.

The rule sending module 1301 is configured to send rule information for responding to the paging message to the terminal.

The rule information instructs the terminal, in response to a communication conflict between an operation of a first SIM card in the terminal responding to the paging message and a communication operation of a second SIM card in the terminal, to solve the communication conflict based on the rule information.

Optionally, the rule information includes resolving the communication conflict based on a relation between a first priority of a service corresponding to the paging cause and a second priority of a service corresponding to the communication operation.

Optionally, the rule information includes resolving the communication conflict based on a relation between a current QoS of the service corresponding to the communication operation and a minimum QoS of the service corresponding to the communication operation.

FIG. 14 is a schematic diagram of an apparatus for acquiring a paging cause according to an embodiment of the disclosure. The apparatus for acquiring a paging cause shown in this embodiment may be applicable for a terminal, which includes, but is not limited to, a cell phone, a tablet computer, a wearable device, a sensor, an IoT device and other electronic devices. The terminal, as a UE, may communicate with a network side device. The network side device may be a base station, and a core network device. The base station includes, but is not limited to, a 4G base station, a 5G base station, and a 6G base station. In an embodiment, the terminal may be a terminal to which the apparatus for acquiring a paging cause described in any of the following embodiments is applied.

One or more SIM cards may be provided in the terminal. For example, the terminal may include a first SIM card, or the terminal may include a first SIM card and a second SIM card. In a case that more than one SIM card is provided in the terminal, some or all of the SIM cards can be connected to different operator networks or to the same operator network. Communication modes supported by the more than one SIM can be set as desired, such as dual SIM single standby, dual SIM dual standby single pass, and dual SIM dual standby dual pass, etc. Illustrative explanation is made below mainly on a case where the terminal is configured with the first SIM card and the second SIM card.

As shown in FIG. 14, the apparatus for acquiring a paging cause includes:

a request sending module 1401, configured to send request information to a network side device in response to a communication conflict between an operation of the first SIM card responding to a paging message and a communication operation of the second SIM card.

The request information requests the network side device to send the paging cause of the paging message to the terminal.

Optionally, the request sending module is configured to, in response to the communication conflict between the operation of the first SIM card responding to the paging message and the communication operation of the second SIM card and a type of the communication conflict being a target type, send the request information to the network side device.

Optionally, the request sending module is configured to, in response to the communication conflict between the operation of the first SIM card responding to the paging message and the communication operation of the second SIM card and a number of times of the communication conflict being greater than or equal to a target value, send the request information to the network side device.

Optionally, the request sending module is configured to, in response to the communication conflict between the operation of the first SIM card responding to the paging message and the communication operation of the second SIM card and the terminal failing to resolve the communication conflict, send the request information to the network side device.

Optionally, the request sending module is configured to send the request information to the network side device via the first SIM card and/or the second SIM card.

Optionally, the network side device is a core network device, and the request information is carried in a NAS signaling; and/or the network side device is a base station, and the request information is carried in an AS signaling.

Figure 15:
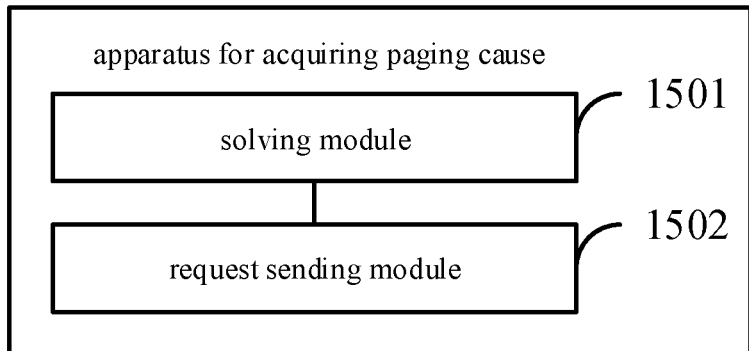
FIG. 15 is a schematic diagram of an apparatus for acquiring a paging cause according to an embodiment of the disclosure.

FIG. 15 is a schematic diagram of an apparatus for acquiring a paging cause according to an embodiment of the disclosure. The apparatus for acquiring a paging cause shown in this embodiment may be applicable for a terminal. The terminal includes, but is not limited to, a cell phone, a tablet computer, a wearable device, a sensor, an IoT device and other electronic devices. The terminal, as a UE, may communicate with a network side device. The network side device may be a base station, and a core network device. The base station includes, but is not limited to, a 4G base station, a 5G base station and a 6G base station. In an embodiment, the network side device may be a network side device to which the apparatus for sending a paging cause described in any of the above embodiments is applied.

One or more SIM cards may be provided in the terminal. For example, the terminal may include a first SIM card, or the terminal may include a first SIM card and a second SIM card. In a case that more than one SIM card is provided in the terminal, some or all of the SIM cards can be connected to different operator networks or to the same operator network. Communication modes supported by the more than one SIM can be set as desired, such as dual SIM single standby, dual SIM dual standby single pass, and dual SIM dual standby dual pass, etc. Illustrative explanation is made below mainly on a case where the terminal is configured with the first SIM card and the second SIM card.

As shown in FIG. 15, the apparatus for acquiring a paging cause includes: a solving module 1501 and a request sending module 1502.

The solving module 1501 is configured to try to resolve a communication conflict based on implementation of the terminal in response to a communication conflict between an operation of the first SIM card responding to a paging message and a communication operation of the second SIM card.

The request sending module 1502 is configured to, in response to failure to resolve the communication conflict, send request information to a network side device.

Optionally, the request sending module is configured to send the request information to the network side device in response to failure to resolve the communication conflict and a type of the communication conflict being a target type.

Optionally, the request sending module is configured to send the request information to the network side device in response to failure to resolve the communication conflict and a number of times of the communication conflict being greater than or equal to a target value.

Optionally, the request sending module is configured to send the request information to the network side device via the first SIM card and/or the second SIM card.

Optionally, the network side device is a core network device, and the request information is carried in a NAS signaling; and/or the network side device is a base station, and the request information is carried in an AS signaling.

With respect to the apparatus in the above embodiments, the specific way in which each module performs its operation has been described in detail in the embodiments of the relevant method, and will not be described in detail here.

The apparatus embodiments basically correspond to the method embodiments, and the related contents can refer to part of the descriptions of the method embodiments. The above-described apparatus embodiments are merely schematic, the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

An embodiment of the disclosure also provides an electronic device. The electronic device includes:

a processor;

a memory for storing instructions executable by the processor; in which the processor is configured to implement the method for sending a paging cause of any one of the above embodiments and/or the method for acquiring a paging cause of any one of the above embodiments.

An embodiment of the disclosure provides a computer readable storage medium having computer programs stored thereon. When the computer programs are executed by a processor, the method for sending a paging cause of any one of the above embodiments and/or the method for acquiring a paging cause of any one of the above embodiments is implemented.

Figure 16:
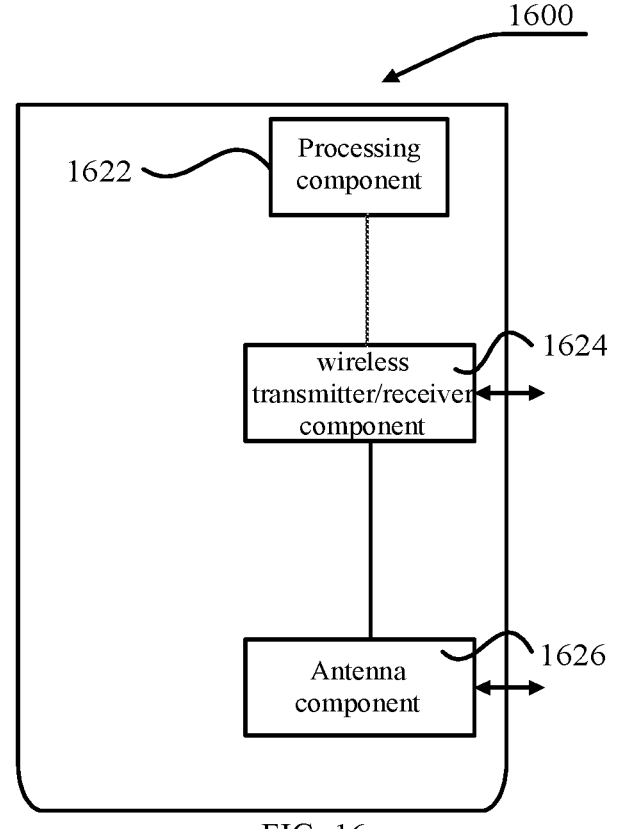
FIG. 16 is a schematic diagram of a device for sending a paging cause according to an embodiment of the disclosure.

FIG. 16 is a schematic diagram of a device 1600 for sending a paging cause according to an embodiment of the disclosure. The device 1600 may be provided as a base station. As shown in FIG. 16, the device 1600 includes a processing component 1622, a wireless transmitter/receiver component 1624, an antenna component 1626, and a signal processing portion specific to a wireless interface. The processing component 1622 may include one or more processors. One of the processors of the processing component 1622 may be configured to implement the method for sending a paging cause described in any one of the above embodiments.

Figure 17:
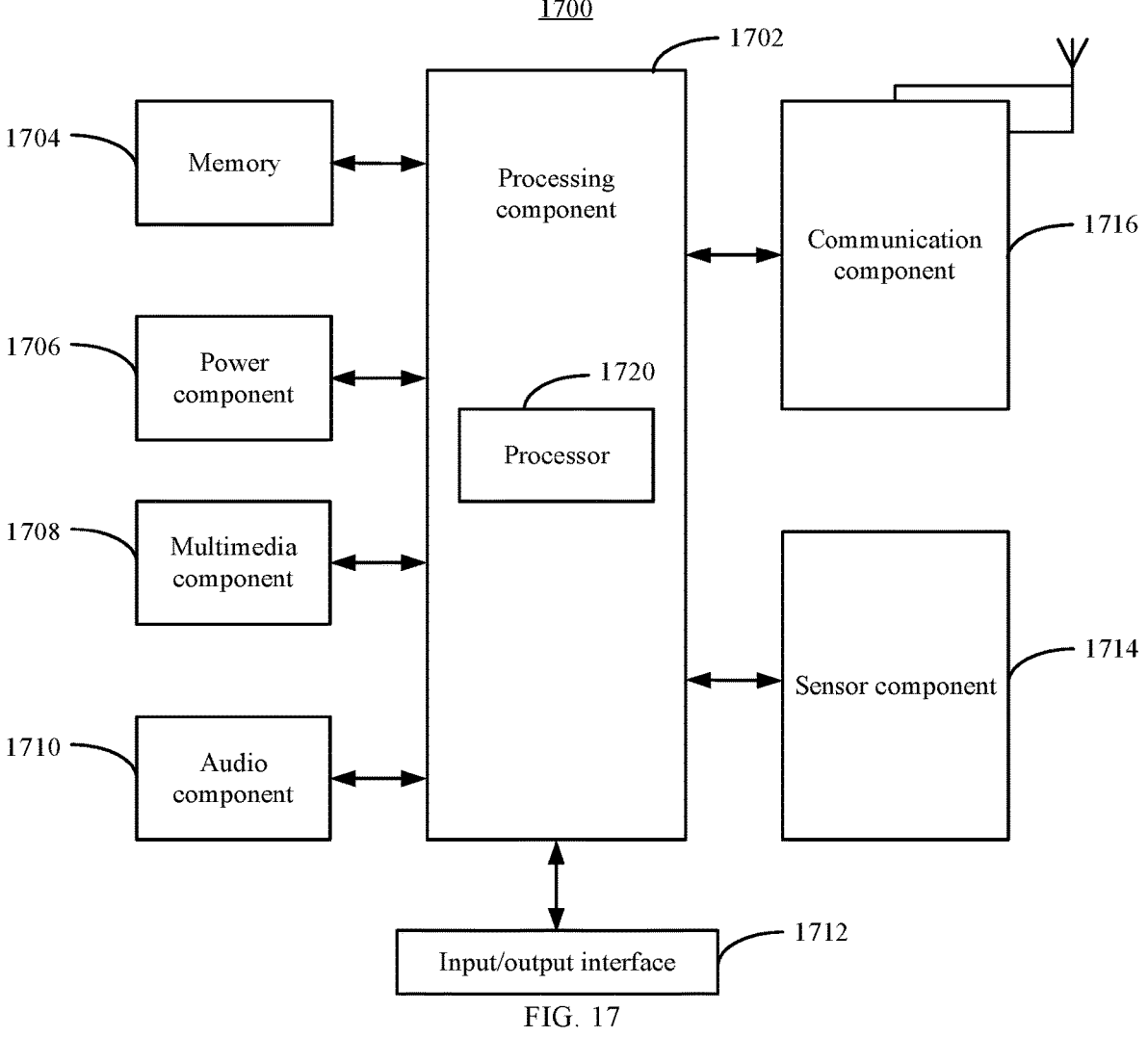
FIG. 17 is a schematic diagram of a device for acquiring a paging cause according to an embodiment of the disclosure.

FIG. 17 is a schematic diagram of a device 1700 for acquiring a paging cause according to an embodiment of the disclosure. For example, the device 1700 may be a cell phone, a computer, a digital broadcast terminal, a message transceiver device, a game console, a tablet device, a medical device, a fitness device and a personal digital assistant.

As shown in FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to perform all or part of the steps in the above described method. Moreover, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front-facing camera and/or a rear-facing camera. When the device 1700 is in an operating mode, such as a shooting mode or a video mode, the front-facing camera and/or the rear-facing camera can receive external multimedia data. Each front-facing camera and rear-facing camera may be a fixed optical lens system or has capabilities of focal length and optical zoom.

The audio component 1710 is configured to output and/or input audio signals. For example, the audio component 1710 includes a microphone (MIC) configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a Complementary Metal Oxide Semiconductor (CMOS) or Charge-Coupled Device (CCD) image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G, 3G, 4G LTE, 5G NR or a combination thereof. In an exemplary embodiment, the communication component 1716 receives a broadcast signal or broadcast associated information from an external broadcast management system via a broadcast channel. In an exemplary embodiment, the communication component 1716 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 1700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including executable instructions, such as the memory 1704, executable by the processor 1720 in the device 1700, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus of the embodiments of the disclosure have been described in detail above, and specific examples are applied in the disclosure to illustrate the principles and implementation of the disclosure. The above embodiments are only used to facilitate understanding the method and core ideas of the disclosure. Meanwhile, for those skilled in the art, according to the ideas of this disclosure, there will be changes in the specific implementation and scope of application. In conclusion, the contents of the disclosure should not be understood as limiting the disclosure.

What is claimed is:

1. A method for sending a paging cause, performed by a network side device, comprising:
    sending a paging message to a terminal;
    sending a paging cause of the paging message to the terminal according to receiving request information sent by the terminal;
    wherein the request information requests the network side device to send the paging cause of the paging message to the terminal;
    wherein the method further comprises:
    sending rule information for responding to the paging message to the terminal; wherein
    the rule information instructs the terminal, according to a communication conflict between an operation of a first Subscriber Identity Module (SIM) card in the terminal responding to the paging message and a communication operation of a second SIM card in the terminal, to solve the communication conflict based on the rule information.

2. The method of claim 1, wherein the rule information comprises resolving the communication conflict based on a relation between a first priority of a service corresponding to the paging cause and a second priority of a service corresponding to the communication operation.

3. The method of claim 1, wherein the rule information comprises resolving the communication conflict based on a relation between a current quality of service of the service corresponding to the communication operation and a minimum quality of service of the service corresponding to the communication operation.

4. A network side device, configured to implement the method for sending the paging cause according to claim 1.

5. A non-transitory computer readable storage medium having computer programs stored thereon, wherein when the computer programs are executed by a processor, steps of the method for sending the paging cause according to claim 1 are implemented.

6. A method for acquiring a paging cause, performed by a terminal at least configured with a first SIM card and a second SIM card, the method comprising:
    sending request information to a network side device according to a communication conflict between an operation of the first SIM card responding to a paging message and a communication operation of the second SIM card;
    wherein the request information requests the network side device to send a paging cause of the paging message to the terminal.

7. The method of claim 6, wherein sending the request information to the network side device according to the communication conflict between the operation of the first SIM card responding to the paging message and the communication operation of the second SIM card comprises:
    sending the request information to the network side device according to the communication conflict between the operation of the first SIM card responding to the paging message and the communication operation of the second SIM card and a type of the communication conflict being a target type.

8. The method of claim 6, wherein sending the request information to the network side device according to the communication conflict between the operation of the first SIM card responding to the paging message and the communication operation of the second SIM card comprises:
    sending the request information to the network side device according to the communication conflict between the operation of the first SIM card responding to the paging message and the communication operation of the second SIM card and a number of times of the communication conflict being greater than or equal to a target value.

9. The method of claim 6, wherein sending the request information to the network side device according to the communication conflict between the operation of the first SIM card responding to the paging message and the communication operation of the second SIM card comprises:
    sending the request information to the network side device according to the communication conflict between the operation of the first SIM card responding to the paging message and the communication operation of the second SIM card and the terminal failing to resolve the communication conflict.

10. The method of claim 6, wherein sending the request information to the network side device comprises:
    sending the request information to the network side device via the first SIM card and/or the second SIM card.

11. The method of claim 6, wherein the network side device is a core network, and the request information is carried in a non-access stratum signaling; and/or
    the network side device is a base station, and the request information is carried in an access stratum signaling.

12. A terminal, at least configured with a first SIM card and a second SIM card, and configured to implement the method for acquiring the paging cause according to claim 6.

13. A non-transitory computer readable storage medium having computer programs stored thereon, wherein when the computer programs are executed by a processor, steps of the method for acquiring the paging cause according to claim 6 are implemented.

14. A method for acquiring a paging cause, performed by a terminal, at least configured with a first SIM card and a second SIM card, the method comprising:

resolving a communication conflict based on implementation of the terminal according to a communication conflict between an operation of the first SIM card responding to a paging message and a communication operation of the second SIM card; and sending request information to a network side device according to a failure to resolve the communication conflict.

15. The method of claim 14, wherein sending the request information to the network side device according to the failure to resolve the communication conflict comprises one of:

sending the request information to the network side device according to the failure to resolve the communication conflict and a type of the communication conflict being a target type; or sending the request information to the network side device according to the failure to resolve the communication conflict and a number of times of the communication conflict being greater than or equal to a target value.

16. The method of claim 14, wherein sending the request information to the network side device comprises:

sending the request information to the network side device via the first SIM card and/or the second SIM card.

17. The method of claim 14, wherein the network side device is a core network device, and the request information is carried in a non-access stratum signaling; and/or the network side device is a base station, and the request information is carried in an access stratum signaling.

18. A terminal, at least configured with a first SIM card and a second SIM card, and configured to implement the method for acquiring the paging cause according to claim 14.

19. A non-transitory computer readable storage medium having computer programs stored thereon, wherein when the computer programs are executed by a processor, steps of the method for acquiring the paging cause of according to claim 14 are implemented.

\* \* \* \* \*